United States Patent [19]

Kinoshita

[11] Patent Number: 4,882,941
[45] Date of Patent: Nov. 28, 1989

[54] RETAINER FOR ONE-WAY CLUTCH

[75] Inventor: Yoshio Kinoshita, Kanagawa, Japan

[73] Assignee: NSK-Warner K.K., Tokyo, Japan

[21] Appl. No.: 51,320

[22] Filed: May 19, 1987

[30] Foreign Application Priority Data

May 23, 1986 [JP]  Japan ................... 61-76934

[51] Int. Cl.$^4$ ............ F16D 15/00; F16D 23/00; F16D 41/06; F16D 43/00
[52] U.S. Cl. ................... 192/45.1; 192/41 A
[58] Field of Search ............ 192/41 A, 45, 45.1; 188/82.8, 82.84

[56] References Cited

U.S. PATENT DOCUMENTS

| 2,366,843 | 1/1945 | Dodge et al. | 192/45.1 |
| 2,399,749 | 5/1946 | Lund | 192/45.1 |
| 2,404,221 | 7/1946 | Dodge | 192/45.1 |
| 2,630,896 | 3/1953 | Dodge | 192/45.1 |
| 2,677,449 | 5/1954 | Wavak | 192/45.1 |
| 2,731,122 | 1/1956 | Dodge | 192/45.1 |
| 2,753,027 | 7/1956 | Troendly et al. | 192/45.1 |
| 2,832,450 | 4/1958 | Wade | 192/45.1 |
| 2,940,568 | 6/1960 | Fagiano | 192/45.1 |
| 4,635,770 | 1/1987 | Shoji et al. | 192/41 A |

FOREIGN PATENT DOCUMENTS

| 2749271 | 2/1979 | Fed. Rep. of Germany | 192/45.1 |
| 3502882 | 8/1985 | Fed. Rep. of Germany | |
| 871537 | 6/1961 | United Kingdom | |

Primary Examiner—Leslie A. Braun
Assistant Examiner—Harold F. Macris
Attorney, Agent, or Firm—Wegner & Bretschneider

[57] ABSTRACT

An annular retainer is provided for use in a one-way clutch, which is constructed of a first and second rotary members arranged spacedly in a radial direction, rotatably relative to each other and concentrically with each other and having axially-extending annular surfaces respectively and torque transmitting members arranged between the first and second rotary members to transmit torques between the annular surfaces. The annular retainer serves to hold the torque transmitting members at equal angular intervals. The retainer has such a specific shape that the retainer is as a whole flexible against the annular surface of the first or second rotary member so as to maintain at least a part of the retainer in contact with the annular surface of the first or second rotary member.

19 Claims, 1 Drawing Sheet

RETAINER FOR ONE-WAY CLUTCH

BACKGROUND OF THE INVENTION (1) Field of the Invention

This invention relates to a one-way clutch, and more specifically to a retainer for a one-way clutch.

(2) Description of the Prior Art

When a one-way clutch (hereinafter abbreviated as "OWC") is incorporated and used in a rotating part of an industrial machine or the like, the OWC has heretofore been retained with a certain degree of drag torque relative to an outer or inner race in order to protect the function of the OWC from vibrations, inertia forces and the like.

When a sudden acceleration or deceleration occurs in the rotation of the outer race by way of example, sprags are caused to slip on the race surface of the outer race due to their inertia forces and frictional forces are developed accordingly. It is hence necessary to apply a frictional force, namely, a drag torque between an outer retainer and the outer race so that the outer retainer and outer race are always rotated as unitary members. This is required to transfer each movement of the outer race promptly to the outer retainer and at the same time to ensure free movements of the sprags. In order to obtain a certain degree of drag torque, the outer retainer has been subjected to cutting machining, namely, T-bar machining or i-bar machining or has been provided with spring members such as drag clips.

Since conventional retainers of the former type are partly cut off, their manufacturing costs are high and in addition, they involve a potential danger that the strength of the retainers themselves is adversely affected. When drag clips or the like are provided as separate members, more parts are required so that their manufacturing costs jump up and their assembly work is also cumbersome. Moreover, the areas of contact between a conventional retainer and the race surfaces of its associated inner and outer races are too small to achieve any stable drag torque.

SUMMARY OF THE INVENTION

An object of this invention is therefore to provide a retainer for an OWC, which can obtain a stable drag torque without reduction to the strength of the retainer, can lower the manufacturing cost, is economical and has a simple structure.

In one aspect of this invention, there is thus provided an annular retainer suitable for use in a one-way clutch constructed of a first and second rotary members arranged spacedly in a radial direction, rotatably relative to each other and concentrically with each other and having axially-extending annular surfaces respectively and torque transmitting members arranged between the first and second rotary members to transmit torques between the annular surfaces. The annular retainer is adapted to hold the torque transmitting members at equal angular intervals. The retainer has such a specific shape that the retainer is as a whole flexible against the annular surface of the first or second rotary member so as to maintain at least a part of the retainer in contact with the annular surface of the first or second rotary member.

Preferably, the retainer has such a specific shape that the retainer has a cylindrical portion and a flange bent at a right angle from one end of the cylindrical portion toward the first or second rotary member and is entirely flexible against the annular surface of the first or second rotary member so as to maintain at least a part of a peripheral outer portion of the flange in contact with the annular surface of the first or second rotary member.

In the annular retainer of this invention, the retainer is flexible in its entirety relative to the annular surface of the first or second rotary member so as to maintain at least a part of a peripheral surface of the retainer in contact with the annular surface, whereby a certain degree of drag torque can be provided between the retainer and the outer or inner race.

The annular retainer of this invention, which is suitable for use in an OWC, has the following advantages:

(1) Since no part of the retainer is cut off, the overall strength of the retainer is high. Namely, the retainer assures a prolonged service life.

(2) A stable drag torque can be obtained because the area of contact can be designed large. The retainer can therefore withstand its use under severe conditions such as vibrations, inertia forces and the like.

(3) The retainer does not require cutting machining or attachment of spring members. Its manufacturing cost is therefore low. The retainer can therefore be provided at a low price.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF PREFERRED EMBODIMENT

Figure 1A:
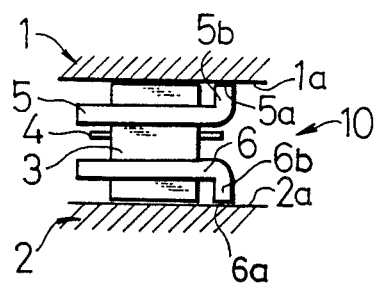
FIG. 1a is an axial cross-section showing a retainer according to one embodiment of this invention, which is suitable for use in an OWC.

One embodiment of this invention will hereinafter be described in detail with reference to the accompanying drawings, in which like elements of structure are indicated by like reference numerals.

Figure 1B:
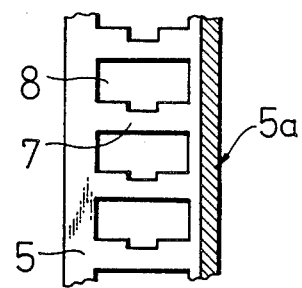
FIG. 1b is a fragmentary top plan view of the retainer, showing a contacting portion in a hatched shade.
Figure 2:
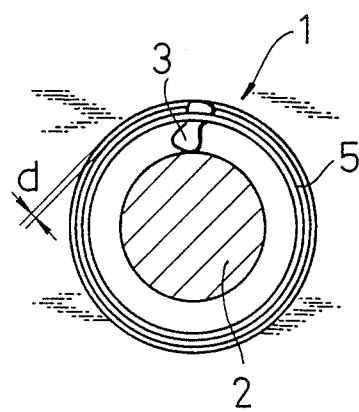
FIG. 2 is a radial cross-section of an OWC in which the retainer of this invention is to be incorporated.

In FIGS. 1a and 1b, the retainer according to the one embodiment of this invention has been applied to a sprag-type OWC.

FIG. 1a is a cross-sectional view of an OWC 10 taken in an axial direction. The first rotary member, namely, an outer race 1 defines a race surface 1a on the inner peripheral wall thereof. The second rotary member, namely, an inner race 2 is arranged inside the outer race 1 and concentrically with the outer race 1. The outer peripheral wall of the inner race 2 defines a race surface 2a. As a result of this construction, the outer race 1 and inner race 2 are rotatable relative to each other with the race surfaces 1a and 2a opposing to each other.

Within an annular space defined by the outer race 1 and inner race 2, there are arranged at equal angular intervals torque transmitting members for transmitting torques therebetween, namely, sprags 3 in the shape of a peanut shell so that torques are transmitted between the inner and outer races. The sprags 3 are held in place within substantially rectangular openings 8 (see FIG. 1b) formed respectively in paired annular retainer members, namely an inner cage 6 and an outer cage 5. The openings 8 of the outer and inner cages 5,6 are each defined by cross bars 7 and both peripheral edge portions of the cage. A ribbon spring 4 is arranged between the outer and inner cages 5,6 so as to give a raising moment to each sprag 3 in a direction that the outer and inner races 1,2 are brought into engagement via the sprags 3.

The inner cage 6 has an annular flange 6b which extends at a right angle from one axial end of the inner cage 6, namely, inwardly in the radial direction to a predetermined distance. The inner cage 6 is, at the free edge 6a of the flange 6d, in contact with the race surface 2a of the inner race 2.

On the other hand, the outer cage 5 has a peripheral flange 5b which extends at a right angle from one axial end of the outer cage 5, namely, outwardly in the radial direction to a predetermined distance. The free edge of the flange 5b and the race surface 1a of the outer race 1 are in contact with each other, so that a contacting portion 5a is formed. As indicated at the hatched portion in FIG. 1b, the contacting portion 5a has a wide area.

In order to form the contacting portion 5a on the outer cage 5, the outer cage 5 is firstly formed in such a way that the contacting portion, where the flange 5b of the outer cage 5 contacts the race surface 1a of the outer race 1, defined substantially a true circle with a predetermined clearance d left between the contacting portion and the race surface 1a. This clearance is provided in order to avoid possible damages to the function of the outer cage 5 as a retainer when the outer cage 5 is machined into an elliptical shape as will be described subsequently.

Figure 3:
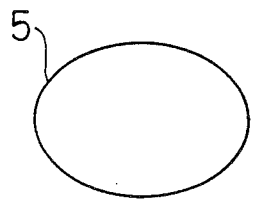
FIG. 3 is a schematic illustration showing one example of the shape of the retainer.

The outer cage 5 is thereafter machined to have the shape depicted in FIG. 3. When the resultant elliptical outer cage 5 is fit within the race surface 1a of the outer race 1, the flange 5b of the outer cage 5 forms the contacting portions 5a relative to the race surface 1a at locations which are opposite to each other on the major axis of the resultant ellipse. The contacting portions 5a are always maintained in contact with the race surface 1a, whereby the outer cage 5 shows as a whole the same function as a spring to obtain a certain degree of drag torque.

Figure 4:
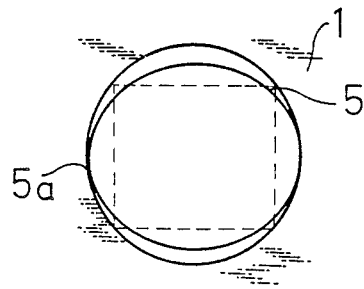
FIG. 4 is a radial cross-section showing the retainer of this invention in a state fit in an outer race.

In FIG. 4, the sprags are omitted for the sake of convenience and the retainer is shown schematically. The elliptical shape depicted in FIGS. 3 and 4 is somewhat exaggerated in order to clarify its description. Needless to say, the ratio of its minor axis to its major axis should actually be a value close to 1 so that free movements of the sprags are not prevented.

Each cage may also be provided in an elliptical shape from the beginning. The ratio of the minor axis to the major axis of the elliptical shape can be chosen as desired in accordance with use and installation conditions. In addition, the elliptical shape of each cage may also be changed into a polygonal shape such as triangular or square shape, in which the individual sides are fully expanded outwards in the radial direction. The dotted lines in FIG. 4 show such a square shape, for example, in schematically exaggerated form. Namely, each cage is required merely to have such a shape that it defines a contacting surface, at which the cage is maintained in contact with the associated race surface, at least at a part thereof so as to have a predetermined degree of flexibility relative to the diametrical dimension of the associated race.

Figure 5:
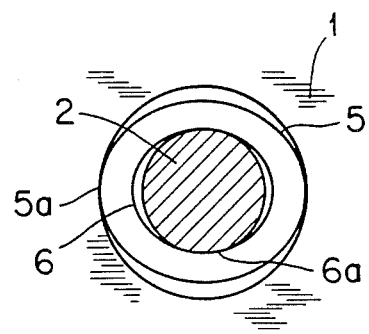
FIG. 5 is a radial cross-section of the retainer of this invention in a state such that it is fit in an outer race and about an inner race.

In the above described embodiment, the outer cage is rendered in its entirety flexible into the elliptical shape. Similar effects can still be achieved even when the cylindrical portion of the outer cage is allowed to remain as a true circle as viewed in cross-section and the outer peripheral portion of the flange is machined into an elliptical shape or the like. It has been described to provide a contacting portion on the outer cage only. It is also possible to machine the inner cage into a similar shape so that the inner cage is maintained in contact with the inner race 2 to obtain a drag torque between the inner cage and the inner race 2. In this case, when machined into an elliptical shape by way of example, the contacting portions with the inner race 2 are obtained on the minor axis. Further, both outer and inner cages can be formed into the above-described shape. Such an arrangement is shown in FIG. 5.

The required degree of drag torque is determined by the contacting area between a race surface and its associated retainer and the degree of flexibility and the shape of the retainer. A desired degree of drag torque can therefore be chosen in accordance with use conditions.

Having now fully described the invention, it will be apparent to one of ordinary skill in the art that many changes and modifications can be made thereto without departing from the spirit or scope of the invention as set forth herein.

I claim:

1. An annular retainer in a one-way clutch, said clutch comprising first and second rotary members arranged spacedly in a radial direction, rotatably relative to each other and concentrically with each other and having axially-extending annular surfaces respectively and torque-transmitting members arranged between the first and second rotary members to transmit torques between the annular surfaces, said annular retainer being located between the first and second rotary members and adapted to hold the torque transmitting members at equal angular intervals, said annular retainer comprising a first retainer member provided adjacent the first rotary member and a second retainer member disposed adjacent the second rotary member, each of said retainer members circumscribing one of said rotary members wherein the retainer has such a specific shape so as to maintain at least a part of one of said retainer members in contact with the annular surface of the first or second rotary member, wherein said one retainer member is flexed in its entirety due to said contact and wherein the first retainer member has, at one axial end thereof, a flange bent at a right angle toward the first rotary member and the first retainer member is in contact with the first rotary member at an end portion of the flange, and wherein said first retainer member has the specific shape formed at the end of said flange.

2. The retainer as claimed in claim 1, wherein the second rotary member is arranged inside the first rotary member and the second retainer member has said specific shape so that the second retainer member is flexed in its entirety against the surface of the second rotary member so as to maintain the second retainer member in contact with the surface of the second rotary member.

3. The retainer as claimed in claim 2, wherein the second retainer member has, at one axial end thereof, a flange bent at a right angle toward the second rotary member and the second retainer member is in contact with the second rotary member at an end portion of the flange.

4. An annular retainer in a one-way clutch, said clutch comprising first and second rotary members arranged spacedly in a radial direction, rotatably relative to each other and concentrically with each other and having axially-extending annular surfaces respectively and torque transmitting members arranged between the first and second rotary members to transmit torques between the annular surfaces, said annular retainer being adapted to hold the torque transmitting members at equal angular intervals, wherein the retainer has such a specific shape that the retainer has a cylindrical portion and a flange bent at a right angle from one end of the cylindrical portion toward the first or second rotary member, said cylindrical portion maintaining at least a part of a peripheral outer portion of the flange in contact with the annular surface of the first or second rotary member, wherein said cylindrical portion is flexed in its entirety due to said contact wherein said retainer has the specific shape formed at the end of said flange.

5. The retainer as claimed in claim 4, wherein the retainer is arranged spacedly in the radial direction between the first and second rotary members and comprises a first retainer member provided adjacent the first rotary member and a second retainer member disposed adjacent the second rotary member, at least one of the retainer members comprising said cylindrical portion.

6. The retainer as claimed in claim 5, wherein the first rotary member is arranged outside the second rotary member and the first retainer member has said specific shape so that the peripheral outer portion of the flange formed on the first retainer member is flexed in its entirety against the surface of the first rotary member so as to maintain the peripheral outer portion in contact with the surface of the first rotary member.

7. The retainer as claimed in claim 5, wherein the second rotary member is arranged inside the first rotary member and the second retainer member has said specific shape so that the peripheral outer portion of the flange formed on the second retainer member is flexed in its entirety against the surface of the second rotary member so as to maintain the peripheral outer portion in contact with the surface of the second rotary member.

8. An annular retainer in a one-way clutch, said clutch comprising first and second rotary members arranged spacedly in a radial direction, rotatably relative to each other and concentrically with each other and having axiallyextending annular surfaces respectively and torque-transmitting members arranged between the first and second rotary members to transmit torques between the annular surfaces, said annular retainer being located between the first and second rotary members and adapted to hold the torque transmitting members at equal angular intervals, said annular retainer comprising a first retainer member provided adjacent the first rotary member and a second retainer member disposed adjacent the second rotary member, wherein the retainer has such a specific shape so as to maintain at least a part of one of said retainer members in contact with the annular surface of the first or second rotary member wherein said one retainer member is flexed in its entirety due to said contact, wherein the first retainer member has, at one axial end thereof, a flange bent at a right angle toward the first rotary member and the first retainer member is in contact with the first rotary member at an end portion of the flange, wherein said first retainer member has the specific shape formed at the end of said flange, and wherein the specific shape is substantially elliptical.

9. The retainer as claimed in claim 8, wherein the specific shape of the first retainer member defines a major and a minor axis, and wherein the first retainer member is in contact with the first rotary member on the major axis thereof.

10. The retainer as claimed in claim 8, wherein the second rotary member is arranged inside the first rotary member and the second retainer member has the specific shape and is flexed in its entirety against the surface of the second rotary member so as to maintain the second retainer member in contact with the surface of the second rotary member.

11. The retainer as claimed in claim 10, wherein the specific shape of the second retainer member defines a major and a minor axis, and wherein the second retainer member is in contact with the second rotary member on the minor axis thereof.

12. The retainer as claimed in claim 11, wherein the second retainer member has, at one axial end thereof, a flange bent at a right angle toward the second rotary member and the second retainer member is in contact with the second rotary member at an end portion of the flange.

13. An annular retainer in a one-way clutch, said clutch comprising first and second rotary members arranged spacedly in a radial direction, rotatably relative to each other and concentrically with each other and having axiallyextending annular surfaces respectively and torque-transmitting members arranged between the first and second rotary members to transmit torques between the annular surfaces, said annular retainer being located between the first and second rotary members and adapted to hold the torque transmitting members at equal angular intervals, said annular retainer comprising a first retainer member provided adjacent the first rotary member and a second retainer member disposed adjacent the second rotary member, wherein the retainer has such a specific shape so as to maintain at least a part of one of said retainer members in contact with the annular surface of the first or second rotary member, wherein said one retainer member is flexed in its entirety due to said contact wherein the first retainer member has, at one axial end thereof, a flange bent at a right angle toward the first rotary member and the first retainer member is in contact with the first rotary member at an end portion of the flange, wherein said first retainer member has the specific shape formed at the end of said flange, and wherein the specific shape is substantially polygonal.

14. An annular retainer in a one-way clutch, said clutch comprising first and second rotary members arranged spacedly in a radial direction, rotatably relative to each other and concentrically with each other and having axiallyextending annular surfaces respectively and torque transmitting members arranged between the first and second rotary members to transmit torques between the annular surfaces, said annular retainer being adapted to hold the torque transmitting members at equal angular intervals, wherein the retainer has such a specific shape that the retainer has a cylindrical portion and a flange bent at a right angle from one end of the cylindrical portion toward the first or second rotary member, said cylindrical portion maintaining at least a part of a peripheral outer portion of the flange in contact with the annular surface of the first or second rotary member, wherein said cylindrical portion is flexed in its entirety due to said contact wherein said retainer has the specific shape formed at the end of said flange, and wherein the specific shape is substantially elliptical.

15. The retainer as claimed in claim 14, wherein said first rotary member is arranged outside the second rotary member, and said retainer is disposed between the first and second rotary members and comprises a first retainer member provided adjacent the first rotary member and a second retainer member provided adjacent the second rotary member, and wherein the first retainer member comprises said cylindrical portion, the first retainer member maintaining the peripheral outer portion of the flange of the first retainer member in contact with the surface of the first rotary member.

16. The retainer as claimed in claim 15, wherein the specific shape of the peripheral outer portion of the flange of the cylindrical portion defines a major and a minor axis, and wherein the peripheral outer portion of the flange of the first retainer member is in contact with the first rotary member on the major axis thereof.

17. The retainer as claimed in claim 14, wherein said first rotary member is arranged outside the second rotary member, and said retainer is disposed between the first and second rotary members and comprises a first retainer member provided adjacent the first rotary member and a second retainer member provided adjacent the second rotary member, and wherein the second retainer member comprising said cylindrical portion, the second retainer member maintaining the peripheral outer portion of the flange of the second retainer member in contact with the surface of the second rotary member.

18. The retainer as claimed in claim 17, wherein the specific shape of the peripheral outer portion of the flange of the cylindrical portion defines a major and a minor axis, and wherein the peripheral outer portion of the flange of the second retainer member is in contact with the second rotary member on the minor axis thereof.

19. An annular retainer in a one-way clutch, said clutch comprising first and second rotary members arranged spacedly in a radial direction, rotatably relative to each other and concentrically with each other and having axiallyextending annular surfaces respectively and torque transmitting members arranged between the first and second rotary members to transmit torques between the annular surfaces, said annular retainer being adapted to hold the torque transmitting members at equal angular intervals, wherein the retainer has such a specific shape that the retainer has a cylindrical portion and a flange bent at a right angle from one end of the cylindrical portion toward the first or second rotary member and is, said cylinderical portion maintaining at least a part of a peripheral outer portion of the flange in contact with the annular surface of the first or second rotary member, wherein said cylindrical portion is flexed in its entirety due to said contact wherein said retainer has the specific shape formed at the end of said flange, and wherein the specific shape is substantially polygonal.

* * * * *